United States Patent [19]

Yamada

[11] Patent Number: 4,464,024

[45] Date of Patent: Aug. 7, 1984

[54] OPTICAL SYSTEM FOR MICROFILM

[75] Inventor: Yu Yamada, Kokubunji, Japan

[73] Assignee: Canon Kabushiki Kaisha, Tokyo, Japan

[21] Appl. No.: 265,952

[22] Filed: May 21, 1981

[30] Foreign Application Priority Data

Jun. 9, 1980 [JP] Japan .................. 55-78054

[51] Int. Cl.³ .............................................. G02B 9/60
[52] U.S. Cl. .................................................. 350/465
[58] Field of Search ............... 350/465, 410, 464, 445, 350/539

[56] References Cited

U.S. PATENT DOCUMENTS

| | | | |
|---|---|---|---|
| 2,405,729 | 8/1946 | Altman | 350/471 X |
| 2,441,036 | 5/1948 | Schade | 350/539 |
| 2,989,895 | 6/1961 | Sandback | 350/465 X |
| 3,482,901 | 12/1969 | Melech | 350/445 |
| 3,536,381 | 10/1970 | Pituley | 350/445 |
| 3,867,018 | 2/1975 | Shoemaker | 350/410 |

FOREIGN PATENT DOCUMENTS

| | | | |
|---|---|---|---|
| 1358101 | 3/1964 | France | 350/464 |
| 47-35027 | 9/1972 | Japan . | |
| 55-28097 | 2/1980 | Japan . | |

*Primary Examiner*—John K. Corbin
*Assistant Examiner*—Scott J. Sugarman
*Attorney, Agent, or Firm*—Fitzpatrick, Cella, Harper & Scinto

[57] ABSTRACT

An optical system for microfilm having an image rotating prism in the vicinity of the end at the image enlarging side of a wide-angle microfilm lens, and having an entrance pupil close to the lens end, thus allowing proper image projection onto the image plane from a microfilm displaced in rotation from a proper position.

6 Claims, 7 Drawing Figures

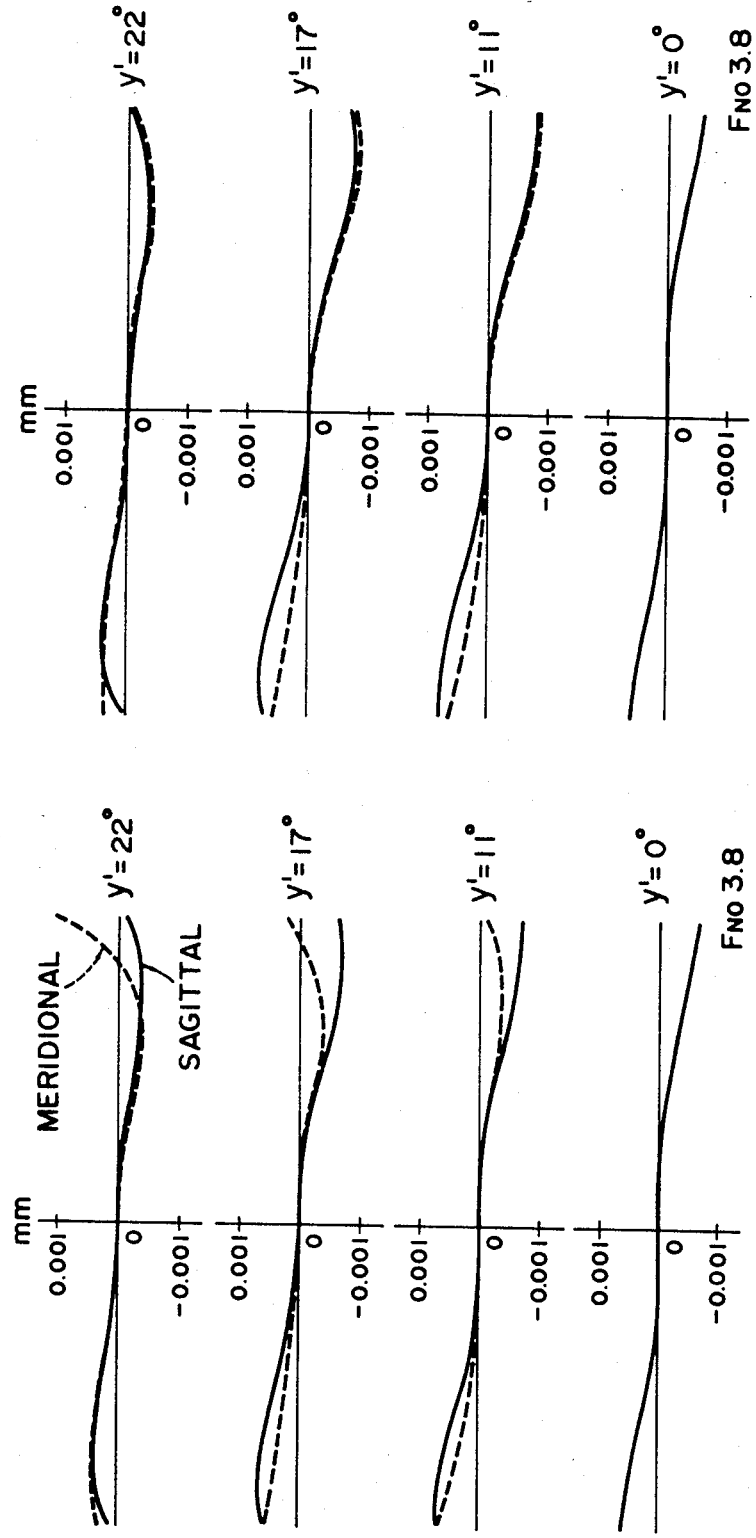
FIG. 4B LATERAL ABERRATION
FIG. 4A LATERAL ABERRATION 4,464,024

OPTICAL SYSTEM FOR MICROFILM

BACKGROUND OF THE INVENTION

1. Field of the Invention

The present invention relates to an optical system for microfilm adapted for use in a microfilm reader or a microfilm printer.

2. Description of the Prior Art

In a microfilming operation, a frame is often microfilmed in a direction different from the direction of other frames. In reading such a frame on a microfilm reader the enlarged image of such frame can be brought to a normal position by rotating the microfilm together with the microfilm holder, but such a method involves a rather cumbersome operation and needs a complicated mechanism.

For this reason, in order to bring the enlarged image to a normal position without rotation of the microfilm itself, there has been proposed to insert an image rotating prism in the optical path, generally in the enlarged image side of the lens, and to rotate said prism for achieving such image rotation. The lens system having such image rotating prism is disclosed for example in the U.S. Pat. Nos. 2,405,729, 3,482,901, 3,536,381 etc.

In a wide-angle lens system, the image rotating prism is generally positioned close to the entrance pupil where the optical is smallest, in order to make the prism and hence the entire system compact.

However in the usual microfilm lenses of the Gauss type structure with the diaphragm in the center of the lens system, the entrance pupil is generally positioned distant from the lens end, so that the image rotating prism to be positioned outside said lens system has to be of a larger size.

It is still possible to reduce the dimension of the image rotating prism by bringing the entrance pupil close to the lens end in the optical design or by employing so-called front diaphragm structure having a mechanical diaphragm in front of the lens system, but the known lens structure as disclosed in the Japanese Patent Publication No. Sho 47-35027 is unable to provide a wide image angle and is therefore unsuitable for compactization of the wide-angle lenses. This is due to a fact that the entrance pupil positioned close to the lens and in the conventional lens structure results in enhanced distortion in the image plane and enhanced astigmatism, and gives rise to an asymmetrical aberration uncorrectable over a wide incident angle.

Japanese Patent Laid-Open No. Sho 55-28097 discloses a zoom lens system similar to the embodiment of the present invention, if the enlarged side and the reduced side are inverted. However said system is essentially different from the present invention in the correction of aberrations as the enlarged side and reduced side are inverted, and does not suggest the combination with the image rotating prism or the compactization in the wide-angle lens system.

SUMMARY OF THE INVENTION

The object of the present invention is to provide a compact optical system for microfilm with a short object-image distance, utilizing a microfilm lens with satisfactorily corrected aberrations over a wide image angle of $2\omega = 44°$ and with the entrance pupil positioned close to the lens end, thereby enabling the use of a small image rotating prism. The above-mentioned object is achieved according to the present invention by a lens structure consisting, in the order from the enlarged image side, of a positive lens I, a biconvex lens II, a lens group III composed of two positive lenses which have a concave first face positioned adjacent to said lens II and of which one lens may includes adhered lenses, and a negative lens IV having a concave second face toward the reduced image side.

BRIEF DESCRIPTION OF THE DRAWINGS

FIGS. 4A and 4B are aberration charts showing the lateral aberration corresponding to the lenses shown in FIGS. 2A and 2B, respectively.

DESCRIPTION OF THE PREFERRED EMBODIMENTS

Figure 1:
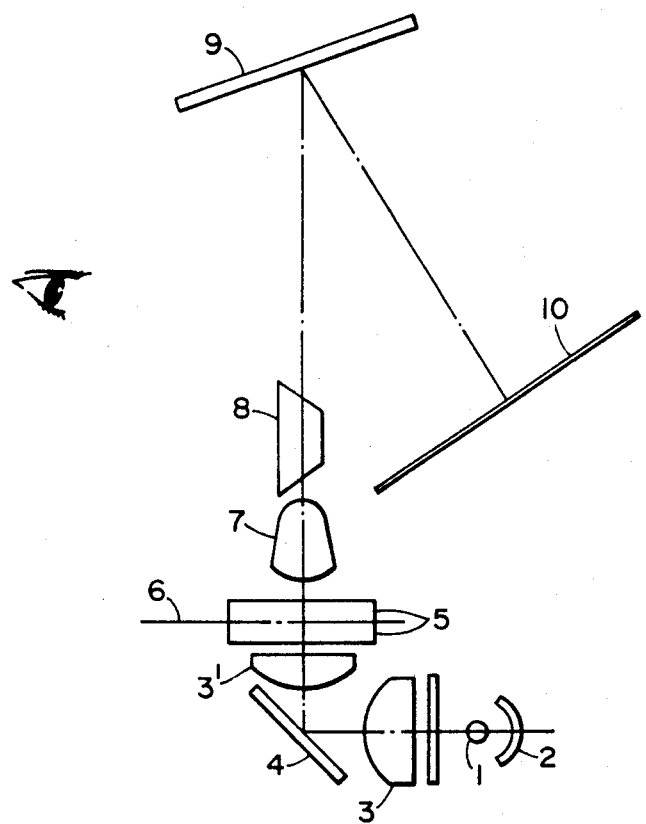
FIG. 1 is a schematic view of a microfilm reader embodying the present invention.

FIG. 1 is a schematic view of a microfilm reader embodying the present invention, wherein the light from a lamp 1 is guided, either directly or after reflection by a concave mirror 2, through a condenser lens 3, a mirror 4 and a condenser lens 3' to illuminate a microfilm 6 supported on a microfilm carrier 5, whereby the image of said microfilm 6 is projected in an enlarged state onto a screen 10 through a microfilm lens 7, an image rotating prism 8 and a mirror 9.

The projected image is rotated by an angle $2\theta$ when the image rotating prism 8 is rotated by an angle $\theta$ about the optical axis, and in this manner the projected image can be brought to the proper position from a rotationally displaced position by rotating said prism by an angle equal to a half of said rotational displacement.

Figure 2A:
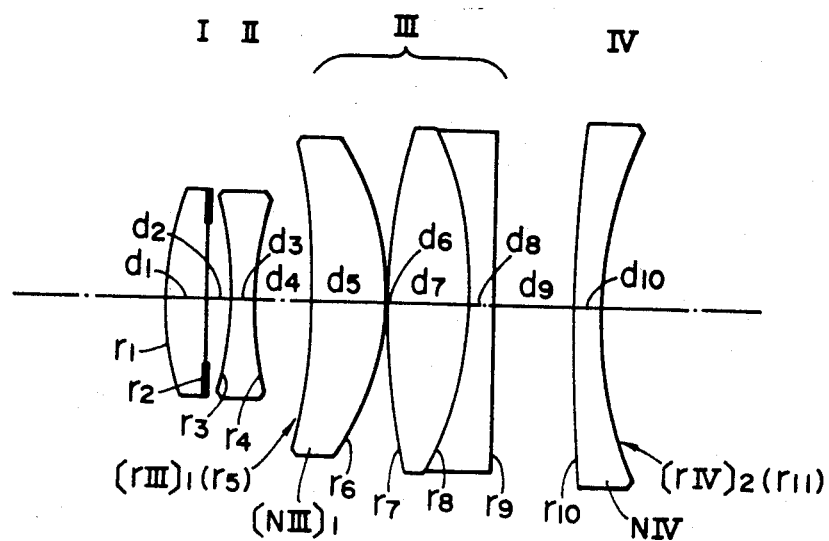
FIGS. 2A and 2B are views showing different embodiments of the microfilm lens of the present invention.
Figure 2B:
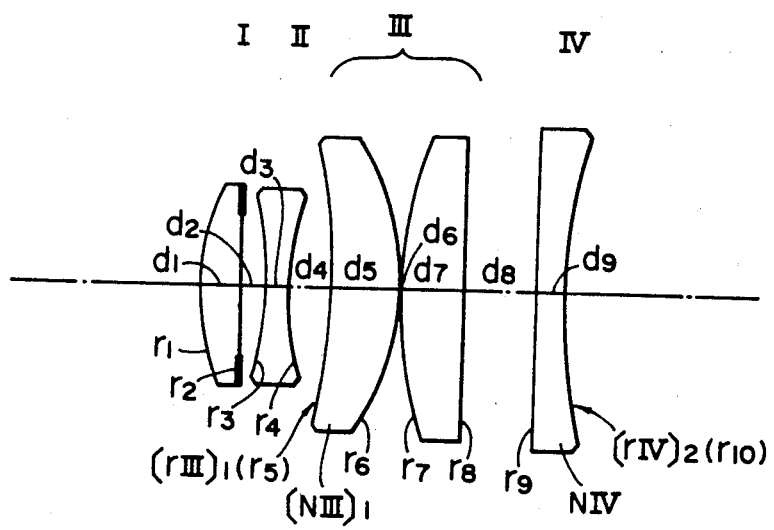

FIGS. 2A and 2B show two different embodiments of the microfilm lens of the present invention, which is composed, in the order from the enlarged image side, of a positive lens I, a biconcave lens II, a lens group III composed of two positive lenses having a concave first face positioned adjacent to said lens II, and negative lens IV having a concave second face directed to the reduced image side.

In the embodiment shown in FIG. 2A, the positive lens of the lens group III at the reduced image side includes two adhered lenses.

As will be apparent from these embodiments, the microfilm lens of the present invention is featured by the facts that:

(1) the negative power of the lens II is shared by the lens IV;

(2) the lens IV has a concave second face directed toward the reduced image side;

(3) the lens groups III has a concave first face directed toward the lens II; and (4) the Petzval's sum is satisfactorily corrected.

Besides, in consideration of the imaging performance, the microfilm lens of the present invention should preferably satisfy the following conditions:

$$-0.85 < \frac{1}{f_{IV}} < -0.5 \qquad (1)$$

-continued $$-1.16 < \frac{1 - N_{IV}}{[\gamma_{IV}]_2} < -0.33 \quad (2)$$

$$-0.94 < \frac{[N_{III}]_1 - 1}{[\gamma_{III}]_1} < -0.46 \quad (3)$$

$$-4.04 < \frac{1}{f_{IV}} + \frac{[N_{III}]_1 - 1}{[\gamma_{III}]_1} + \frac{1}{f_{II}} < -3.56 \quad (4)$$

wherein:
$f_{IV}$: focal length of the lens IV
$N_{IV}$: refractive index of the lens IV
$[\gamma_{IV}]_2$: radius of curvature of the second face of the lens IV
$[N_{III}]_1$: refractive index of the lens in the lens group III closest to the lens II
$[\gamma_{III}]_1$: radius of curvature of the first face of the lens in the lens group III closest to the lens II
$f_{II}$: focal length of the lens II
for a focal length of F=1.

The above-mentioned relation (1) represents a condition for correcting the astigmatism and the curvature of image plane at a large image angle resulting from the lens II, by sharing the negative power thereof with the lens IV, while maintaining the Petzval's sum in the same sign.

The correction for the internal coma aberration at a large image angle or for the external coma aberration at a small image angle becomes difficult below the lower limit, respectively, or above the upper limit of said condition.

The above-mentioned relation (2) represents a condition for correcting the barrel-shaped distortion and the external coma aberration resulting from the positive lens group III by employing the lens IV with a concave second face directed to the reduced image side.

The correction for the external coma aberration or for the barrel-shaped distortion becomes difficult below the lower limit, respectively or above the upper limit of said condition.

The above-mentioned relation (3) represents a condition for correcting the astigmatism and the curvature of the image plane at a large image angle while maintaining the Petzval's sum in a same sign, by employing a concave first face in the lens group III directed toward the lens II to share the negative power of the lens II.

The correction for the external coma aberration at a small image angle or for the internal coma aberration at a large image angle becomes difficult respectively below the lower limit or above the upper limit of said condition.

The above-mentioned relation (4) represents a condition for obtaining a satisfactory Petzval's sum to correct the curvature of image plane by maintaining an appropriate negative power.

In the following there is shown numerical examples 1 to 7, wherein a film carrier glass plate (d=0.1162 mm, n=1.51633, $\nu$=6.41) is positioned behind the lens IV, and the calculations are made under the conditions of magnification=1/23, $F_{NO}$=3.8 and $\omega$=22°. In these examples, the focal length F is assumed to be equal to unity, and the following symbols are employed:
$\gamma_i$: radius of curvature
$d_i$: lens thickness or lens distance
$n_i$: refractive index for d line
$\nu_i$: dispersion.

The microfilm lenses shown in FIGS. 2A and 2B correspond to the numerical examples 2 and 4, respectively.

NUMERICAL EXAMPLE 1

| | | $\gamma_i$ | $d_i$ | | $n_i$ | $\nu_i$ | |
|---|---|---|---|---|---|---|---|
| I | { | $\gamma_1$ = 0.46185 | $d_1$ = 0.0788 | | $n_1$ = 1.64769 | $\nu_1$ = 33.8 | |
| | | $\gamma_2$ −2.10609 | $d_2$ 0.0331 | | | | |
| II | { | $\gamma_3$ −0.70501 | $d_3$ 0.0360 | | $n_2$ 1.74077 | $\nu_2$ 27.8 | |
| | | $\gamma_4$ 0.51943 | $d_4$ 0.1007 | | | | |
| III | { | $\gamma_5$ −1.44966 | $d_5$ 0.1587 | | $n_3$ 1.78590 | $\nu_3$ 44.2 | |
| | | $\gamma_6$ −0.54080 | $d_6$ 0.0052 | | | | |
| | | $\gamma_7$ 1.28886 | $d_7$ 0.1627 | | $n_4$ 1.77250 | $\nu_4$ 49.6 | |
| | | $\gamma_8$ −0.45533 | $d_8$ 0.0497 | | $n_5$ 1.66680 | $\nu_5$ 33.0 | |
| | | $\gamma_9$ −6.96890 | $d_9$ 0.1715 | | | | |
| IV | { | $\gamma_{10}$ 3.71322 | $d_{10}$ 0.0497 | | $n_6$ 1.53996 | $\nu_6$ 59.5 | |
| | | $\gamma_{11}$ 0.66796 | | | | | |

$$\frac{1}{f_{IV}} = -0.659 \quad \frac{[N_{III}]_1 - 1}{[\gamma_{III}]_1} = -0.542$$

$$\frac{1 - N_{IV}}{[\gamma_{IV}]_2} = -0.808 \quad \frac{1}{f_{IV}} + \frac{[N_{III}]_1 - 1}{[\gamma_{III}]_1} + \frac{1}{f_{II}} = -3.709$$

diaphragm: 0.0000 from $\gamma_2$.

NUMERICAL EXAMPLE 2

| | | $\gamma_i$ | $d_i$ | | $n_i$ | $\nu_i$ | |
|---|---|---|---|---|---|---|---|
| I | { | $\gamma_1$ = 0.48399 | $d_1$ = 0.0783 | | $n_1$ = 1.66755 | $\nu_1$ = 41.9 | |
| | | $\gamma_2$ −2.63178 | $d_2$ 0.0456 | | | | |
| II | { | $\gamma_3$ −0.70558 | $d_3$ 0.0361 | | $n_2$ 1.69895 | $\nu_2$ 30.1 | |
| | | $\gamma_4$ 0.53163 | $d_4$ 0.1110 | | | | |
| III | { | $\gamma_5$ −1.14783 | $d_5$ 0.1254 | | $n_3$ 1.77250 | $\nu_3$ 49.6 | |
| | | $\gamma_6$ −0.52277 | $d_6$ 0.0053 | | | | |
| | | $\gamma_7$ 1.18547 | $d_7$ 0.1502 | | $n_4$ 1.77250 | $\nu_4$ 49.6 | |
| | | $\gamma_8$ −0.59792 | $d_8$ 0.0494 | | $n_5$ 1.62004 | $\nu_5$ 36.3 | |
| | | $\gamma_9$ −11.56119 | $d_9$ 0.1380 | | | | |
| IV | { | $\gamma_{10}$ 2.64809 | $d_{10}$ 0.0494 | | $n_6$ 1.57501 | $\nu_6$ 41.5 | |
| | | $\gamma_{11}$ 0.70280 | | | | | |

$$\frac{1}{f_{IV}} = -0.595 \quad \frac{[N_{III}]_1 - 1}{[\gamma_{III}]_1} = -0.673$$

$$\frac{1 - N_{IV}}{[\gamma_{IV}]_2} = -0.818 \quad \frac{1}{f_{IV}} + \frac{[N_{III}]_1 - 1}{[\gamma_{III}]_1} + \frac{1}{f_{II}} = -3.601$$

diaphragm: 0.0042 from $\gamma_2$.

NUMERICAL EXAMPLE 3

| | | $\gamma_i$ | $d_i$ | | $n_i$ | $\nu_i$ | |
|---|---|---|---|---|---|---|---|
| I | | $\gamma_1$ = 0.44556 | $d_1$ = 0.0623 | | $n_1$ = 1.64769 | $\nu_1$ = 33.8 | |
| | | $\gamma_2$ −2.12113 | $d_2$ 0.0315 | | | | |
| II | | $\gamma_3$ −0.69222 | $d_3$ 0.0361 | | $n_2$ 1.74077 | $\nu_2$ 27.8 | |
| | | $\gamma_4$ 0.52463 | $d_4$ 0.0679 | | | | |
| III | { | $\gamma_5$ −0.88101 | $d_5$ 0.1638 | | $n_3$ 1.78590 | $\nu_3$ 44.2 | |
| | | $\gamma_6$ −0.46930 | $d_6$ 0.0052 | | | | |
| | | $\gamma_7$ 1.27673 | $d_7$ 0.1883 | | $n_4$ 1.77250 | $\nu_4$ 49.6 | |
| | | $\gamma_8$ −0.46930 | $d_8$ 0.0497 | | $n_5$ 1.66680 | $\nu_5$ 33.0 | |
| | | $\gamma_9$ −7.41892 | $d_9$ 0.2054 | | | | |
| IV | { | $\gamma_{10}$ 2.13087 | $d_{10}$ 0.0497 | | $n_6$ 1.53996 | $\nu_6$ 59.5 | |
| | | $\gamma_{11}$ 0.67938 | | | | | |

$$\frac{1}{f_{IV}} = -0.535 \quad \frac{[N_{III}]_1 - 1}{[\gamma_{III}]_1} = -0.892$$

$$\frac{1 - N_{IV}}{[\gamma_{IV}]_2} = -0.795 \quad \frac{1}{f_{IV}} + \frac{[N_{III}]_1 - 1}{[\gamma_{III}]_1} + \frac{1}{f_{II}} = -3.940$$

diaphragm: 0.0000 from $\gamma_2$.

NUMERICAL EXAMPLE 4

| | | $\gamma_i$ | $d_i$ | | $n_i$ | $\nu_i$ |
|---|---|---|---|---|---|---|
| I | { | $\gamma_1$ = 0.39886 | $d_1$ = 0.0862 | | $n_1$ = 1.72000 | $\nu_1$ = 43.7 |
| | | $\gamma_2$ −30.83273 | $d_2$ 0.0402 | | | |

-continued

| | | | | | | | |
|---|---|---|---|---|---|---|---|
| II | $\gamma_3$ | −0.84740 | $d_3$ | 0.0375 | $n_2$ | 1.72825 $\nu_2$ | 28.5 |
| | $\gamma_4$ | 0.43679 | $d_4$ | 0.0933 | | | |
| III | $\gamma_5$ | −1.22160 | $d_5$ | 0.1215 | $n_3$ | 1.72000 $\nu_3$ | 50.2 |
| | $\gamma_6$ | −0.46499 | $d_6$ | 0.0055 | | | |
| | $\gamma_7$ | 0.81632 | $d_7$ | 0.1141 | $n_4$ | 1.71300 $\nu_4$ | 53.9 |
| | $\gamma_8$ | 22.60417 | $d_8$ | 0.1400 | | | |
| IV | $\gamma_9$ | −15.74723 | $d_9$ | 0.0513 | $n_5$ | 1.57501 $\nu_5$ | 41.5 |
| | $\gamma_{10}$ | 0.88025 | | | | | |

$$\frac{1}{f_{IV}} = -0.691 \qquad \frac{[N_{III}]_1 - 1}{[\gamma_{III}]_1} = -0.589$$

$$\frac{1 - N_{IV}}{[\gamma_{IV}]_2} = -0.653 \qquad \frac{1}{f_{IV}} + \frac{[N_{III}]_1 - 1}{[\gamma_{III}]_1} + \frac{1}{f_{II}} = -3.838$$

diaphragm: 0.0028 from $\gamma_2$.

NUMERICAL EXAMPLE 5

| | | | | | | | |
|---|---|---|---|---|---|---|---|
| I | $\gamma_1 =$ | 0.38437 | $d_1 =$ | 0.0830 | $n_1 =$ | 1.72000 $\nu_1 =$ | 43.7 |
| | $\gamma_2$ | −14.44521 | $d_2$ | 0.0321 | | | |
| II | $\gamma_3$ | −0.81511 | $d_3$ | 0.0361 | $n_2$ | 1.72825 $\nu_2$ | 28.5 |
| | $\gamma_4$ | 0.42484 | $d_4$ | 0.0929 | | | |
| III | $\gamma_5$ | −1.17706 | $d_5$ | 0.1169 | $n_3$ | 1.72000 $\nu_3$ | 50.2 |
| | $\gamma_6$ | −0.44139 | $d_6$ | 0.0053 | | | |
| | $\gamma_7$ | 0.80858 | $d_7$ | 0.1100 | $n_4$ | 1.71300 $\nu_4$ | 53.8 |
| | $\gamma_8$ | 16.42664 | $d_8$ | 0.1347 | | | |
| IV | $\gamma_9$ | −2.17774 | $d_9$ | 0.0493 | $n_5$ | 1.57501 $\nu_5$ | 41.5 |
| | $\gamma_{10}$ | 1.10575 | | | | | |

$$\frac{1}{f_{IV}} = -0.788 \qquad \frac{[N_{III}]_1 - 1}{[\gamma_{III}]_1} = -0.612$$

$$\frac{1 - N_{IV}}{[\gamma_{IV}]_2} = -0.520 \qquad \frac{1}{f_{IV}} + \frac{[N_{III}]_1 - 1}{[\gamma_{III}]_1} + \frac{1}{f_{II}} = -4.040$$

diaphragm: 0.0000 from $\gamma_2$.

NUMERICAL EXAMPLE 6

| | | | | | | | |
|---|---|---|---|---|---|---|---|
| I | $\gamma_1 =$ | 0.38588 | $d_1 =$ | 0.0786 | $n_1 =$ | 1.72000 $\nu_1 =$ | 43.7 |
| | $\gamma_2$ | −15.29955 | $d_2$ | 0.0433 | | | |
| II | $\gamma_3$ | −0.82750 | $d_3$ | 0.0360 | $n_2$ | 1.72825 $\nu_2$ | 28.5 |
| | $\gamma_4$ | 0.42136 | $d_4$ | 0.0970 | | | |
| III | $\gamma_5$ | −1.11874 | $d_5$ | 0.1151 | $n_3$ | 1.69350 $\nu_3$ | 50.3 |
| | $\gamma_6$ | −0.44360 | $d_6$ | 0.0053 | | | |
| | $\gamma_7$ | 0.83289 | $d_7$ | 0.1236 | $n_4$ | 1.71300 $\nu_4$ | 53.8 |
| | $\gamma_8$ | 31.48229 | $d_8$ | 0.1426 | | | |
| IV | $\gamma_9$ | −2.14226 | $d_9$ | 0.0493 | $n_5$ | 1.57501 $\nu_5$ | 41.5 |
| | $\gamma_{10}$ | 1.43408 | | | | | |

$$\frac{1}{f_{IV}} = -0.673 \qquad \frac{[N_{III}]_1 - 1}{[\gamma_{III}]_1} = -0.620$$

$$\frac{1 - N_{IV}}{[\gamma_{IV}]_2} = -0.401 \qquad \frac{1}{f_{IV}} + \frac{[N_{III}]_1 - 1}{[\gamma_{III}]_1} + \frac{1}{f_{II}} = -3.933$$

diaphragm: 0.0110 from $\gamma_2$.

NUMERICAL EXAMPLE 7

| | | | | | | | |
|---|---|---|---|---|---|---|---|
| I | $\gamma_1 =$ | 0.39115 | $d_1 =$ | 0.0820 | $n_1 =$ | 1.60342 $\nu_1 =$ | 38.0 |
| | $\gamma_2$ | 77.76424 | $d_2$ | 0.0287 | | | |
| II | $\gamma_3$ | −0.76933 | $d_3$ | 0.0361 | $n_2$ | 1.72825 $\nu_2$ | 28.5 |
| | $\gamma_4$ | 0.48654 | $d_4$ | 0.0584 | | | |
| III | $\gamma_5$ | −1.39261 | $d_5$ | 0.1897 | $n_3$ | 1.71300 $\nu_3$ | 53.8 |
| | $\gamma_6$ | −0.45525 | $d_6$ | 0.0053 | | | |
| | $\gamma_7$ | 0.67584 | $d_7$ | 0.1444 | $n_4$ | 1.71300 $\nu_4$ | 53.8 |
| | $\gamma_8$ | 5.72687 | $d_8$ | 0.1394 | | | |

-continued

| | | | | | | | |
|---|---|---|---|---|---|---|---|
| IV | $\gamma_9$ | 2.46149 | $d_9$ | 0.0495 | $n_5$ | 1.64769 $\nu_5$ | 33.8 |
| | $\gamma_{10}$ | 0.59315 | | | | | |

$$\frac{1}{f_{IV}} = -0.820 \qquad \frac{[N_{III}]_1 - 1}{[\gamma_{III}]_1} = -0.512$$

$$\frac{1 - N_{IV}}{[\gamma_{IV}]_2} = -1.092 \qquad \frac{1}{f_{IV}} + \frac{[N_{III}]_1 - 1}{[\gamma_{III}]_1} + \frac{1}{f_{II}} = -3.805$$

diaphragm: 0.0036 from $\gamma_2$.

Figure 3A:
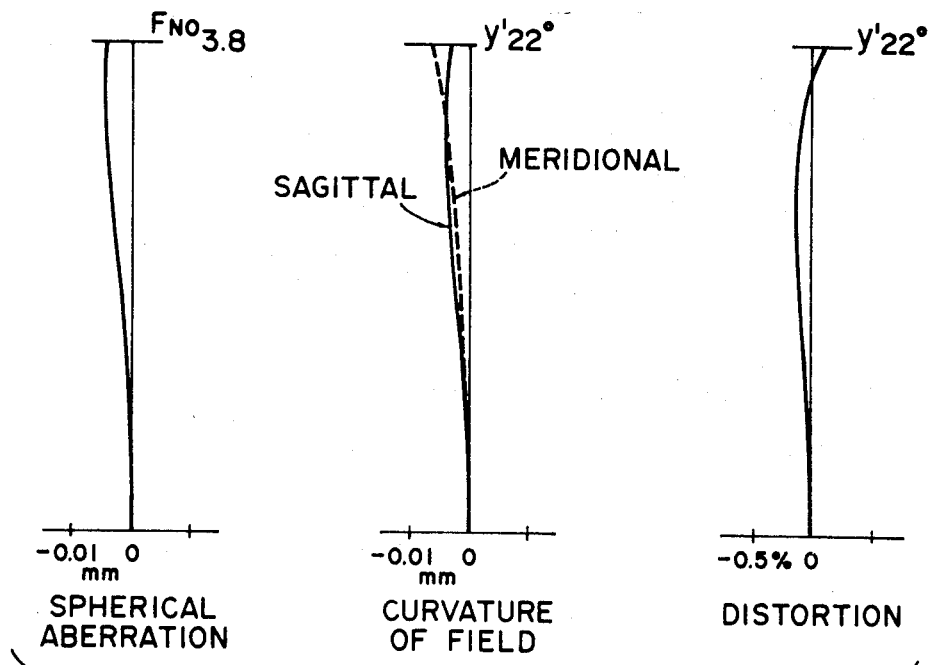
FIGS. 3A and 3B are aberration charts showing the spherical aberration, image plane curvature and distortion aberration, respectively, corresponding to the lenses shown in FIGS. 2A and 2B.
Figure 3B:
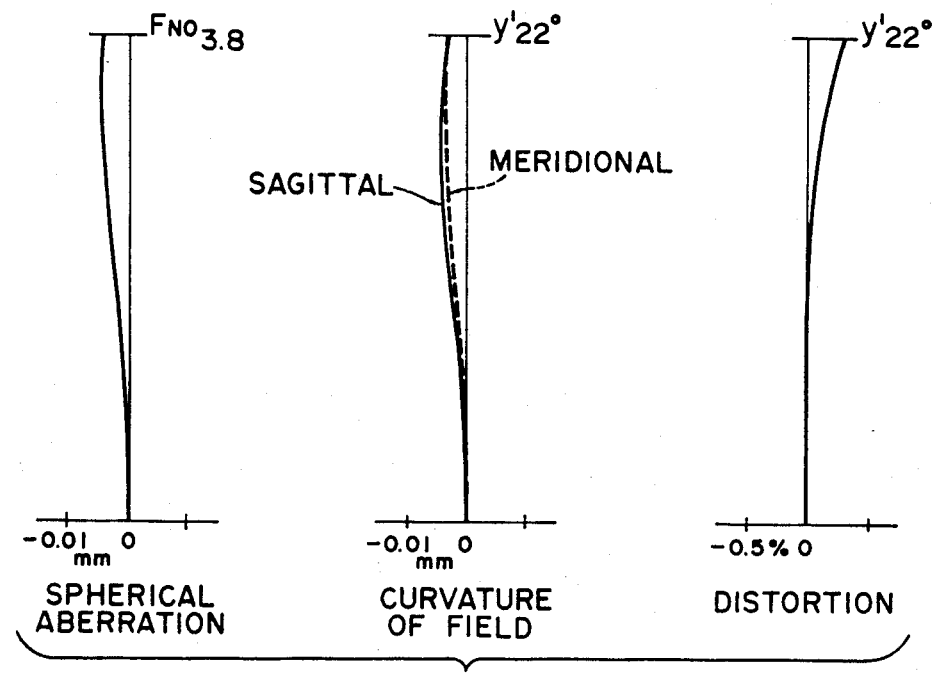

FIGS. 3A and 3B are aberration charts showing the spherical aberration, curvature of image plane and distortion aberration corresponding to the numerical examples 2 and 4, respectively.

Also FIGS. 4A and 4B are aberration charts showing the lateral aberration corresponding to the numerical examples 2 and 4, respectively. From these charts it will be understood that the projection lens of the present invention, when used at F=25 to 35 mm, provides a resolving power of at least 5 lines/mm enough for use with microfilms, combined with satisfactorily corrected aberrations over a wide image angle.

The present invention is not limited to the use in combination with image rotating prism but is also applicable to other similar image position correcting elements.

As explained in the foregoing, the present invention provides an optical system for microfilm having a lens for microfilm showing satisfactorily corrected aberrations over an image angle as wide as 2ω=44° and allowing the use of a small image rotating prism.

What I claim is:

1. An optical system for microfilm, comprising:
   a projection lens system consisting essentially of, in order from the enlarged image side, a positive lens I, a biconcave lens II, a lens group III including two positive lenses having a concave first face directed toward the enlarged image side, and a negative lens IV having a concave last face, wherein an entrance pupil is positioned in the vicinity of the first face of said positive lens I and a stop is disposed inside of said projection optical system and at a position different from the position of the entrance pupil; and
   an image position correcting member being provided in the optical path of said projection lens system outside of said projection lens system and in the vicinity of an end of said projection lens system directed toward the enlarged image side, and being adapted to correct rotational displacement of the image from a proper position thereof.

2. An optical system for microfilm according to the claim 1, wherein said projection lens satisfies the following conditions:

$$-0.85 < \frac{1}{f_{IV}} < -0.5$$

$$-1.16 < \frac{1 - N_{IV}}{[\gamma_{IV}]_2} < -0.33$$

$$-0.94 < \frac{[N_{III}]_1 - 1}{[\gamma_{III}]_1} < -0.46$$

-continued $$-4.04 < \frac{1}{f_{IV}} + \frac{[N_{III}]_1 - 1}{[\gamma_{III}]_1} + \frac{1}{f_{II}} < -3.56$$

wherein the focal length is assumed to be F=1, and:
$f_{IV}$: focal length of lens IV;
$N_{IV}$: refractive index of lens IV;
$[\gamma_{IV}]_2$: radius of curvature of the second face of lens IV;
$[N_{III}]_1$: refractive index of the lens in lens group III closest to the lens II;
$[\gamma_{III}]_1$: radius of curvature of the first face of the lens in lens group III closest to the lens II; and
$f_{II}$: focal length of lens II.

3. An optical system for microfilm according to the claim 2, wherein said image position correcting member is an image rotating prism.

4. An optical system for microfilm according to the claim 2, wherein at least one of two positive lenses in said lens group III includes adhered lenses.

5. A lens for microfilm, comprising, in the order from the enlarged image side, a positive lens I, a biconcave lens II, a lens group III including two positive lenses having a concave first face directed toward the enlarged image side, and a negative lens IV having a concave last face, and satisfying the following conditions:

$$-0.85 < \frac{1}{f_{IV}} < -0.5$$

$$-1.16 < \frac{1 - N_{IV}}{[\gamma_{IV}]_2} < -0.33$$

$$-0.94 < \frac{[N_{III}]_1 - 1}{[\gamma_{III}]_1} < -0.46$$

$$-4.04 < \frac{1}{f_{IV}} + \frac{[N_{III}]_1 - 1}{[\gamma_{III}]_1} + \frac{1}{f_{II}} < -3.56$$

wherein the focal length is assumed to be F=1, and:
$f_{IV}$: focal length of lens IV;
$N_{IV}$: refractive index of lens IV;
$[\gamma_{IV}]_2$: radius of curvature of the second face of lens IV;
$[N_{III}]_1$: refractive index of the lens in the lens group III closest to the lens II;
$[\gamma_{III}]_1$: radius of curvature of the first face of the lens in lens group III closest to the lens II; and
$f_{II}$: focal length of lens II.

6. An optical system, comprising:
a projection lens system consisting essentially of, in the order from the enlarged image side, a positive lens I, a single biconcave lens II, a lens group III including two positive lenses having a concave first face directed toward the enlarged image side, and a negative lens IV having a concave last face, wherein an entrance pupil is positioned in the vicinity of the first face of said positive lens I and a stop being disposed inside of said projection system and at a position different from the position of the entrance pupil.

* * * * *